(12) United States Patent
Avendano Arenas et al.

(10) Patent No.: US 10,350,968 B2
(45) Date of Patent: Jul. 16, 2019

(54) AIR VENT REGISTER FOR A VEHICLE

(71) Applicant: FORD GLOBAL TECHNOLOGIES, LLC, Dearborn, MI (US)

(72) Inventors: Pamela Avendano Arenas, Mexico City (MX); Jesus Marini Parissi, Mexico City (MX); Jesus Ricardo Vargas Sosa, Atizapan de Zaragoza (MX)

(73) Assignee: Ford Global Technologies LLC, Dearborn, MI (US)

( * ) Notice: Subject to any disclaimer, the term of this patent is extended or adjusted under 35 U.S.C. 154(b) by 470 days.

(21) Appl. No.: 14/938,300

(22) Filed: Nov. 11, 2015

(65) Prior Publication Data

US 2017/0129313 A1    May 11, 2017

(51) Int. Cl.
    *B60H 3/00*      (2006.01)

(52) U.S. Cl.
    CPC ... *B60H 3/0028* (2013.01); *B60H 2003/0042* (2013.01)

(58) Field of Classification Search
    CPC .. B60H 3/0028; B60H 3/0007; B60H 3/0014; B60H 2003/0064; B60H 2003/0042; A61L 2209/15; A61L 2209/16; A61L 9/04
    USPC ................. 454/152, 154–156, 143
    See application file for complete search history.

(56) References Cited

U.S. PATENT DOCUMENTS

| | | | |
|---|---|---|---|
| 4,722,264 A * | 2/1988 | DeGuisseppe | B60H 3/0007 261/60 |
| 4,814,212 A | 3/1989 | Spector | |
| 5,240,487 A | 8/1993 | Kung | |
| 5,269,723 A * | 12/1993 | Bender | B60H 3/0007 239/57 |
| 5,314,669 A | 5/1994 | Hamilton | |
| 5,422,078 A * | 6/1995 | Colon | A61L 9/12 239/54 |
| 5,460,787 A | 10/1995 | Colon | |
| 6,019,676 A * | 2/2000 | Kim | B60H 3/0608 454/155 |
| 6,099,137 A | 8/2000 | McCormack et al. | |

(Continued)

FOREIGN PATENT DOCUMENTS

| | | |
|---|---|---|
| EP | 1721767 B1 | 4/2008 |
| JP | 2006143075 A * | 6/2006 |

(Continued)

OTHER PUBLICATIONS

English machine translation of KR101201666B1.
English machine translation of KR20090126784A.

*Primary Examiner* — Steven B McAllister
*Assistant Examiner* — Ko-Wei Lin
(74) *Attorney, Agent, or Firm* — Vichit Chea; King & Schickli PLLC

(57) ABSTRACT

A vent register for a motor vehicle includes an integral scent-dispensing chamber configured for selectively allowing a vehicle heating, ventilation, and air-conditioning (HVAC) airflow therethrough. The scent-dispensing chamber includes a rear wall having one or more rear wall apertures and carrying a damper that is selectively translatable between an open configuration and a closed configuration to control a flow of conditioned air through the chamber. A selectively closeable scent-dispensing chamber front panel allows inserting or removing an air freshening substance.

20 Claims, 4 Drawing Sheets

(56) References Cited

U.S. PATENT DOCUMENTS

| | | | |
|---|---|---|---|
| 6,190,607 B1 | 2/2001 | Farmer | |
| 6,197,263 B1 * | 3/2001 | Blount | A61L 9/03 |
| | | | 392/390 |
| 6,374,044 B1 * | 4/2002 | Freidel | A61L 9/03 |
| | | | 239/34 |
| 7,097,555 B2 * | 8/2006 | Bourbon | B60H 1/34 |
| | | | 422/123 |
| 2002/0139251 A1 * | 10/2002 | Simmons | B01D 46/0036 |
| | | | 96/134 |
| 2003/0202922 A1 | 10/2003 | Farmer | |
| 2003/0220069 A1 * | 11/2003 | Orendorff | F24F 13/082 |
| | | | 454/290 |
| 2004/0072532 A1 * | 4/2004 | Cho | B60H 1/3414 |
| | | | 454/155 |
| 2004/0072533 A1 * | 4/2004 | Cho | B60H 1/3414 |
| | | | 454/155 |
| 2007/0111653 A1 * | 5/2007 | Endou | B60H 1/3421 |
| | | | 454/155 |
| 2013/0341424 A1 | 12/2013 | Brandenburg et al. | |
| 2015/0290350 A1 * | 10/2015 | Marschall | B60H 3/0014 |
| | | | 96/222 |

FOREIGN PATENT DOCUMENTS

| | | |
|---|---|---|
| KR | 20090126784 A | 12/2009 |
| KR | 101201666 B1 | 11/2013 |
| WO | 2004078501 A1 | 9/2004 |

\* cited by examiner

AIR VENT REGISTER FOR A VEHICLE

TECHNICAL FIELD

This disclosure relates generally to air vents and air vent registers for dispensing conditioned air from a vehicle heating, ventilation, and air conditioning (HVAC) system. More particularly, the disclosure relates to an air vent register including a scent dispensing chamber.

BACKGROUND

It is common to utilize air fresheners, scent capsules or cartridges, and the like to mask or remove undesirable odors, or to provide a desired aroma to a portion of a vehicle such as the passenger cabin interior. A variety of such devices are known, including "hang tag" style air fresheners which are hung from a portion of the vehicle such as the rear view mirror. Alternatively, various scents are provided in liquid form for sprinkling at various locations within the passenger cabin. Still more, cartridge-style scent dispensers are known which may be placed in an unobtrusive location within the passenger cabin. Such devices, while allowing dispersion of a desired scent, typically do not evenly distribute the scent in the passenger cabin. Moreover, hang tag style air fresheners risk obscuring a driver's view through the vehicle windshield.

It is also known to provide other attachable devices for distributing a scent. Such devices typically include a chamber for holding a solid or liquid scent source and may include a clip for affixing to a portion of the vehicle. For example, certain clip-on devices are configured for attaching to a portion of a vehicle vent register. As conditioned air from the vehicle heating, ventilation, and air-conditioning (HVAC) system passes through the vent register, it also passes over and/or through the clip-on scent dispenser, advantageously providing a more even dispensing of scent throughout the passenger cabin.

However, such clip-on scent dispensers also create certain problems. Depending on their design, a portion of the HVAC airflow may be blocked, resulting in reduced distribution of conditioned air from the HVAC system. Moreover, it is common for such clip-on devices to be configured to attach to one or more vanes associated with the vent register. As is known, such vanes are typically configured to pivot to allow re-directing airflow from the HVAC system as desired. However, a clip-on device may interfere with the pivoting movement of such vanes, reducing the user's ability to control the direction of air movement.

Accordingly, the present disclosure relates to an improved motor vehicle vent register. Advantageously, the described vent register incorporates an integral scent-dispensing chamber without increasing a footprint defined by the vent register.

SUMMARY

In accordance with the purposes and benefits described herein, in one aspect of the present disclosure a vent register for a motor vehicle is described. The vent register comprises an integral scent-dispensing chamber configured for selectively allowing a vehicle heating, ventilation, and air-conditioning (HVAC) airflow therethrough. The scent-dispensing chamber includes a rear wall having one or more rear wall apertures and carrying a damper. The damper is selectively translatable between an open configuration allowing the HVAC airflow through the scent-dispensing chamber and a closed configuration preventing the HVAC airflow through the scent-dispensing chamber. The scent-dispensing chamber may include a selectively closeable front panel allowing adding an air freshener, replacing a spent air freshener, etc.

In embodiments, the rear wall includes one or more damper supports configured to allow sliding translation of the damper between the open configuration and the closed configuration. The damper may include one or more damper apertures disposed to at least partially align with the one or more rear wall apertures when the damper is translated from the closed configuration to the open configuration.

In embodiments, the rear wall is configured to define an acute angle relative to a plane defined by a wall of the vent register housing. The damper may include a first portion defining a same angle as the rear wall included angle and a second portion carrying an actuator for selectively translating the damper. The first portion may include the one or more damper apertures. In embodiments, the actuator may be configured to pass through a slot defined in a roof of the scent-dispensing chamber. In such embodiments, the actuator functions both for actuating the damper and as a dog to retain the selectively translatable damper in place against the rear wall.

In another aspect, a vent register for a motor vehicle is described including a housing in fluid communication with a vehicle heating, ventilation, and air-conditioning (HVAC) duct system, a plurality of vanes pivotally carried by the housing for directing an HVAC airflow, and an integral scent-dispensing chamber as described above, configured for selectively allowing the HVAC airflow therethrough. The scent-dispensing chamber may define a same width dimension and height dimension as one or more of the plurality of vanes, thus allowing providing an integral air freshener option without increasing a footprint of the vent register.

In the following description, there are shown and described embodiments of the disclosed motor vehicle vent register. As it should be realized, the vent register is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed vent register for a motor vehicle, and together with the description serve to explain certain principles thereof. In the drawings.

Reference will now be made in detail to embodiments of the disclosed vent register for a motor vehicle, examples of which are illustrated in the accompanying drawing figures.

DETAILED DESCRIPTION

Figure 1:
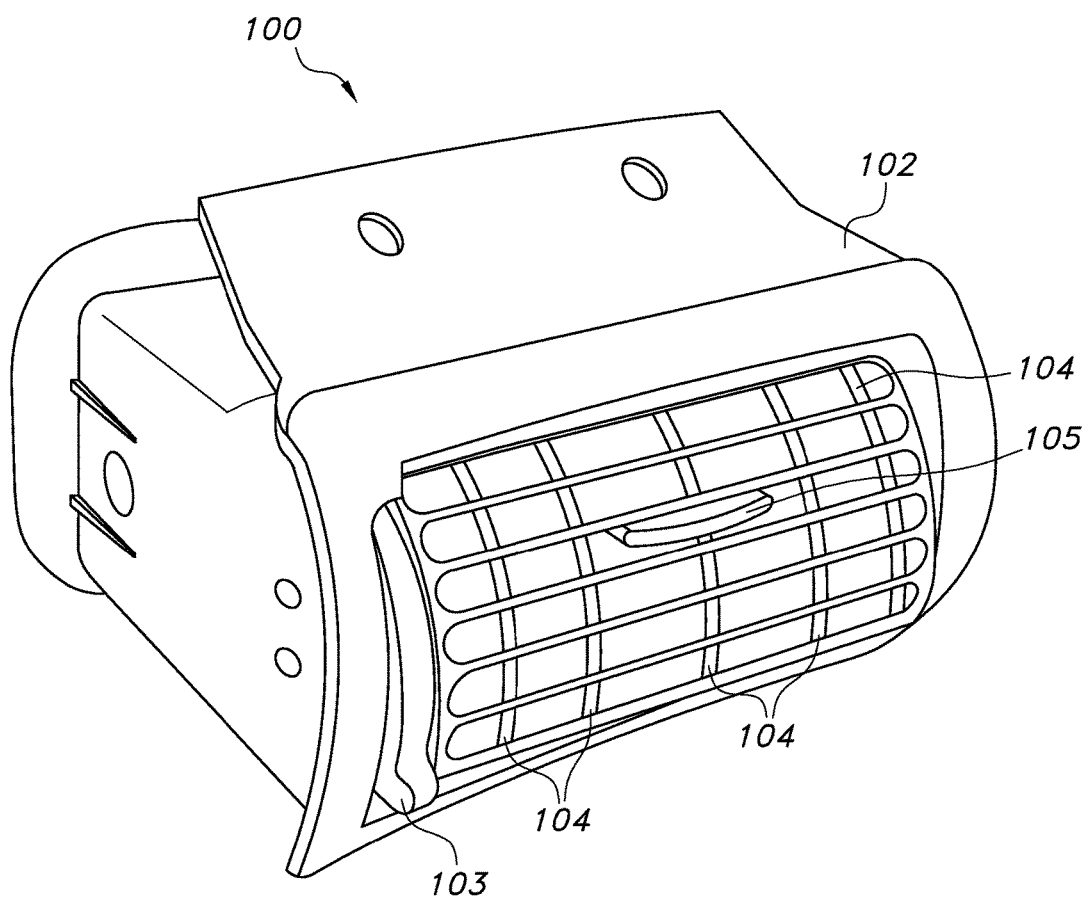
FIG. 1 depicts a prior art vehicle vent register.

Preliminarily, the basic design of a vehicle vent register is well-known and does not require extensive description herein. However, at a high level and with reference to FIG. 1, a vent register 100 includes a housing 102 and one or more vanes 104. The housing 102 is typically configured for insertion into and attachment to a cooperating aperture (not shown) in a vehicle component such as a dash panel, door trim panel, roof trim panel, etc. The housing 102 is typically positioned at a terminal end of a vehicle HVAC duct (not shown) whereby the duct is in fluid communication with the housing interior such that conditioned air from the HVAC passes through the housing 102 and therefrom into the vehicle passenger cabin (not shown). The vanes 104 are typically pivotally attached to the housing to direct a flow of conditioned air from the vehicle HVAC (not shown) through the vent register 100 and into a vehicle passenger cabin (not shown). A damper actuator 103 may be included for operating a damper (not shown) which regulates the amount of conditioned air exiting the vent register 100. A vane actuator 105 may also be included for altering the angle at which conditioned air exits the vent register.

Figure 2:
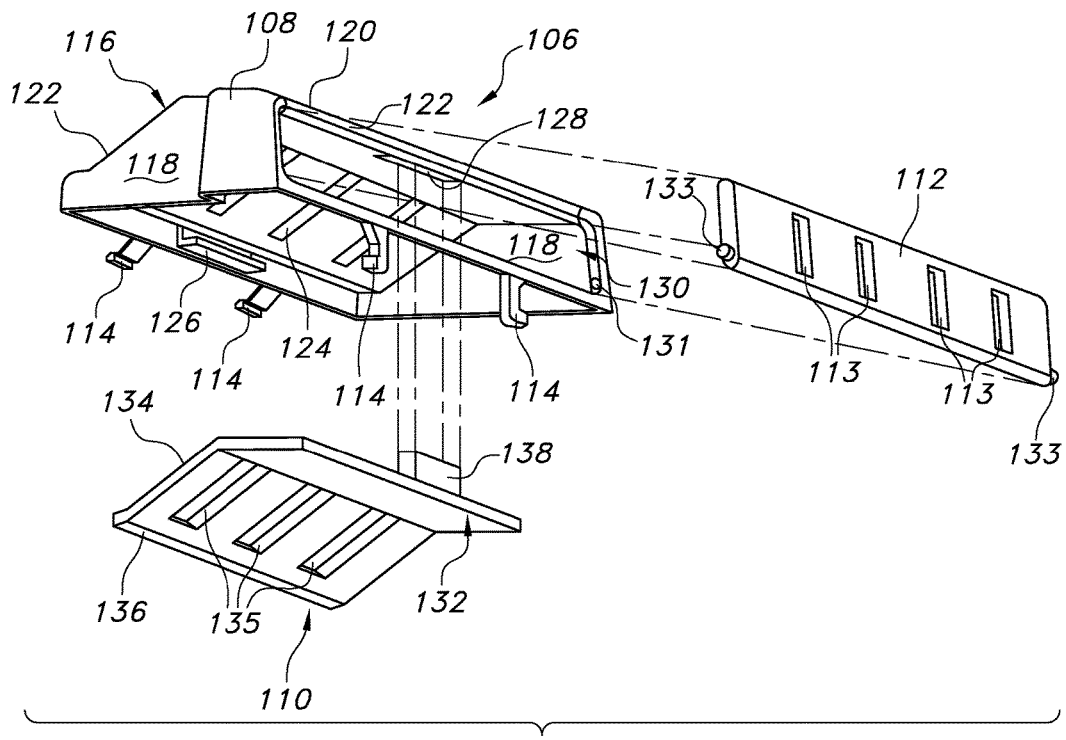
FIG. 2 shows an exploded view of a scent-dispensing chamber according to the present disclosure.

FIG. 2 depicts an exploded view of a scent-dispensing chamber 106 for integral incorporation into a vent register 100. The scent-dispensing chamber includes a chamber housing 108 configured to carry a damper 110 and a closeable pivoting front panel 112. The front panel 112 includes one or more apertures 113 therethrough to allow airflow even when the front panel is in a closed configuration. One or more fittings 114 may be associated with the chamber housing 106 for attachment to a portion of the vent register housing 102. In the depicted embodiment, snap-fit fittings 114 are provided for a convenient snap-fit with cooperating apertures in the vent register housing 102 (not shown). Of course, alternative fitting types are known and contemplated for use herein.

The chamber housing 108 as shown includes a rear wall 116, opposed side walls 118, and a top 120. In the depicted embodiment, a portion 122 of the rear wall 116 defines an acute angle relative to a plane defined by a wall of the vent register housing 102, the purpose of which will be described below. In the depicted embodiment, the portion 122 defines an acute angle relative to a plane defined by a floor of the vent register housing 102. However, it will be appreciated that alternative configurations are possible and therefore contemplated. For example, the chamber housing 108 could be disposed at a top of the vent register 100 rather than at a bottom. In this embodiment, the portion 122 would define an acute angle relative to a plane defined by a top of the vent register housing 102. Likewise, the chamber housing 108 could be disposed at a side portion of the vent register 100, whereby the chamber housing portion 122 would define an acute angle relative to a plane defined by a side wall of the vent register housing.

The rear wall angled portion 122 includes one or more apertures 124 therethrough, in the depicted embodiment being elongate slots. In alternative embodiments, the rear wall 116 may not include this optional angled portion 122. The rear wall portion 122 also includes one or more damper supports 126. The chamber housing top 120 as depicted also includes a top aperture 128, for receiving therethrough a feature of the damper 110 as will be described. At least a portion of a front 130 of the chamber housing 108 is open, and configured for pivotally receiving the closeable front panel 112. In the depicted embodiment, this is accomplished by providing recesses 131 for pivotally receiving cooperating pins 133 disposed on opposed edges of the front panel 112, although alternative structures are possible.

The damper 110 is defined by a body 132 having a rear portion 134 configured to provide a mating surface for the scent-dispensing chamber housing rear wall 116. Thus, in the depicted embodiment the rear portion 134 defines an angle matching the acute angle described above for the scent-dispensing chamber housing rear wall 116. The damper body rear portion also includes one or more apertures 135 which, as will be described, may selectively be at least partially aligned with the corresponding scent-dispensing housing rear wall apertures 124 to allow passage of conditioned HVAC air. The damper body rear portion 134 ends in an edge 136 configured to be slidingly received in or supported by the chamber housing damper support 126. The damper body 132 also includes an associated protrusion 138 configured to be slidingly translated along a length dimension of the scent-dispensing chamber housing top aperture 128.

Figure 3:
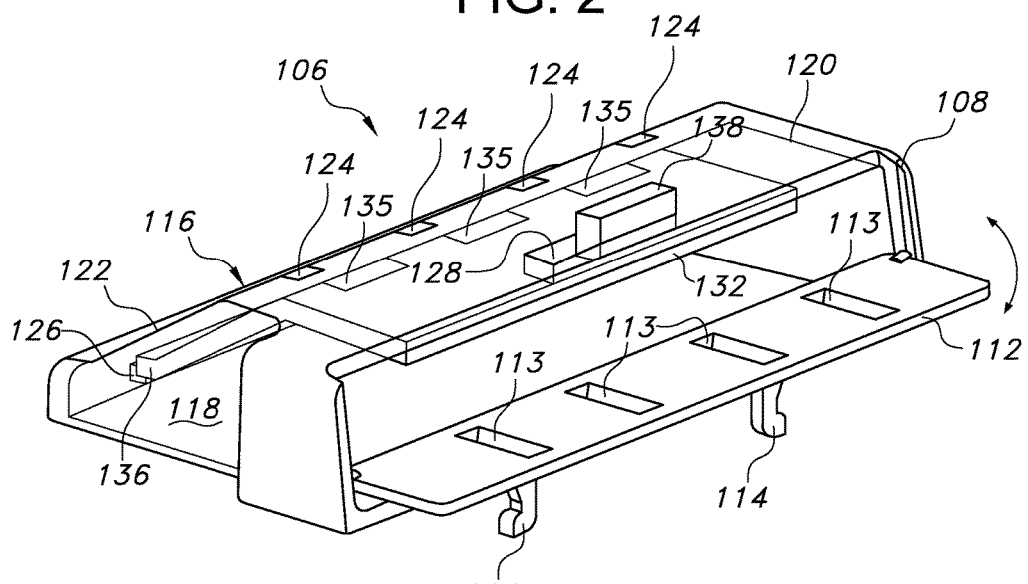
FIG. 3 shows an assembled view of the scent-dispensing chamber of FIG. 2.

As shown in FIG. 3, the edge 136 of the damper body 132 slots into or is supported by the scent-dispensing chamber housing damper support 126. In turn, the damper body protrusion 138 is inserted into the scent-dispensing chamber housing aperture 128. As shown, the damper body 132 is dimensioned such that the protrusion 138 serves both as an actuator for sliding lateral translation of the damper body, and as a dog retaining the damper body in operative contact with the scent-dispensing chamber housing 108 as depicted.

Figure 4:
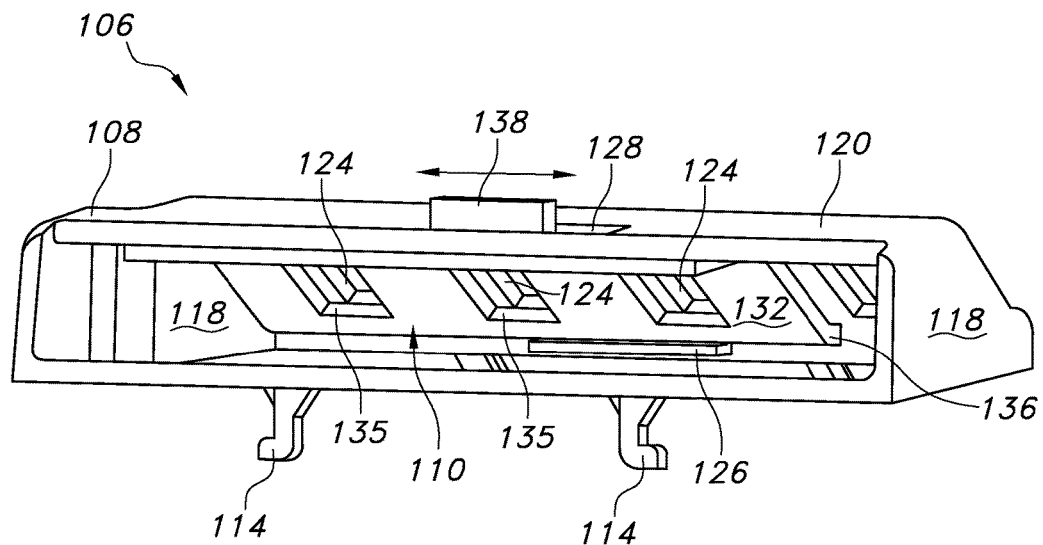
FIG. 4 depicts operation of a sliding damper for the chamber of FIG. 2.

Lateral translation of the damper 110 within the scent-dispensing chamber housing 108 effected by urging protrusion 138 in a desired direction is illustrated in FIG. 4. As will be appreciated, the lateral range of motion of the damper body 132 will be constrained by the dimensions of the chamber housing top aperture 128. As will also be appreciated, fully aligning damper body apertures 135 and corresponding scent-dispensing housing rear wall apertures 124 by biasing the damper 110 in a desired direction will allow a full flow of conditioned HVAC air through the chamber housing 108. Partially aligning the damper body apertures 135 and corresponding scent-dispensing housing rear wall apertures 124 will allow a reduced flow of conditioned HVAC air through the chamber housing 108. A full misalignment of the damper body apertures 135 and corresponding scent-dispensing housing rear wall apertures 124 will block the flow of conditioned HVAC air through the chamber housing 108.

Figure 5:
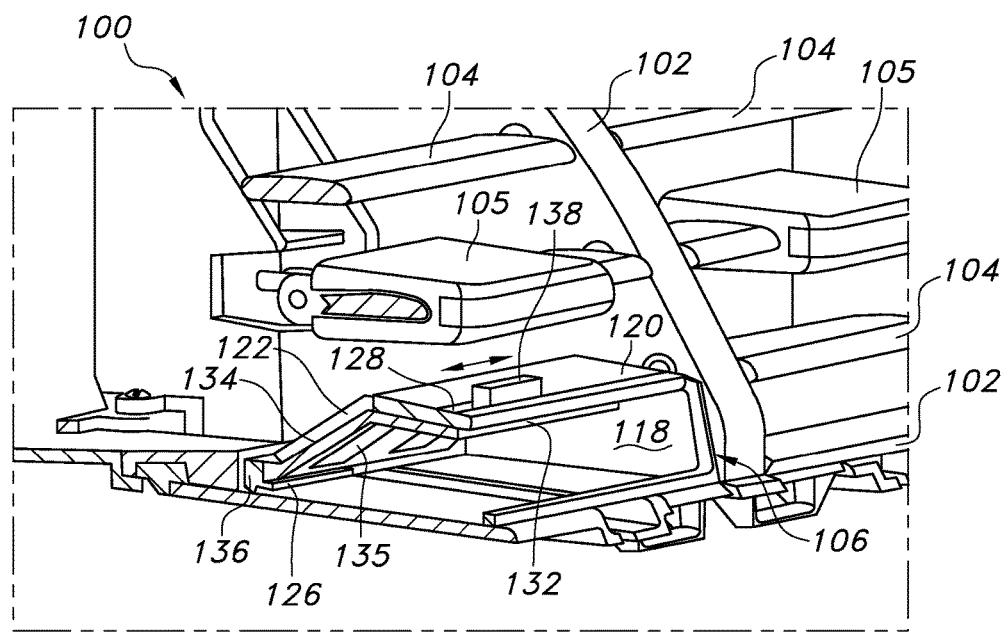
FIG. 5 shows a sectional view of a vehicle vent register including an integral scent-dispensing chamber according to the present disclosure.

FIG. 5 shows a sectional view of a vehicle vent register 100 including a scent-dispensing chamber 106. As shown, the scent-dispensing chamber housing 108 is attached to a bottom portion of the vent register housing 102, thereby placing the scent-dispensing chamber in the path of airflow exiting an HVAC duct (not shown) and passing through the vent register 100. However, as will readily be appreciated, alternative configurations are possible, for example attaching the scent-dispensing chamber housing 108 to a top portion of the vent register housing 102 as described above. In yet another alternative embodiment, the scent-dispensing chamber housing 108 could be attached to a side wall of the vent register housing 102. In each case, the scent-dispensing chamber would be place din the path of airflow exiting an HVAC duct (not shown) and passing through the vent register 100. All such alternative embodiments are contemplated herein.

Figure 6A:
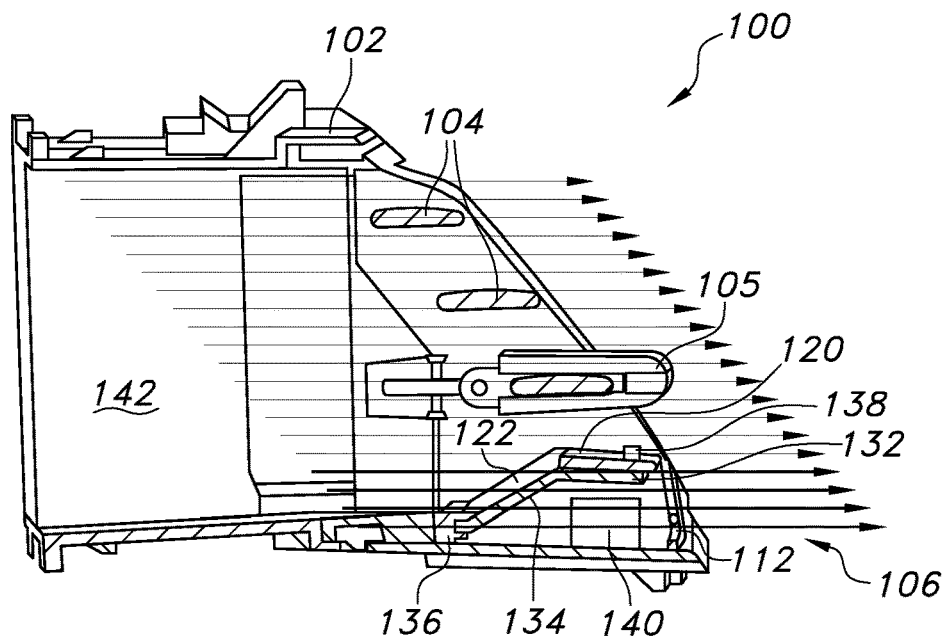
FIG. 6A shows an HVAC airflow through the vent register of FIG. 5 with the sliding damper of the integral scent-dispensing chamber in an open configuration.
Figure 6B:
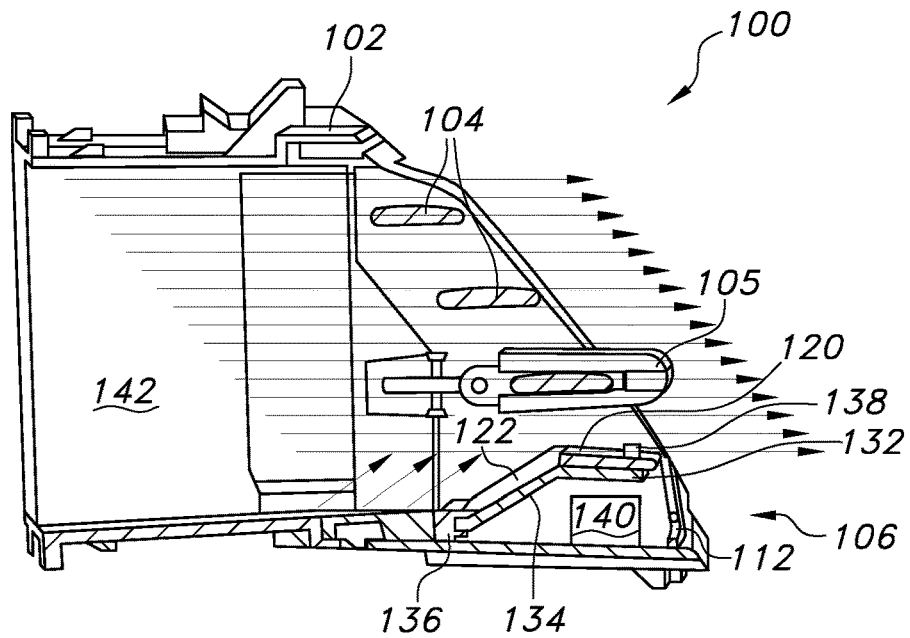
FIG. 6B shows the HVAC airflow through the vent register of FIG. 5 with the sliding damper of the integral scent-dispensing chamber in a closed configuration.

FIGS. 6A and 6B depict the vehicle vent register 100 including the scent-dispensing chamber 106 of FIG. 5 in use to dispense a scent emanating from an air freshener or other scent module 140 disposed in an interior of the scent-dispensing chamber 106. The module 140 may be of any suitable form including without intending any limitation a cake or pellet, a cartridge containing a solid- or liquid-form scent, and others. The vent register housing 102 is depicted, as it would be when installed in a vehicle, in fluid communication with an HVAC duct 142.

FIG. 6A depicts the situation where the damper 110 has been positioned whereby the damper body apertures 135 and corresponding scent-dispensing housing rear wall apertures 124 are aligned. In this configuration full airflow through the scent-dispensing chamber 106 is allowed (see arrows) and a scent from the module 140 is dispensed out into the vehicle passenger cabin (not shown). Of course, as described above intermediate positions for the damper 110 are possible whereby the damper body apertures 135 and corresponding scent-dispensing housing rear wall apertures 124 are only partially aligned to provide a reduced conditioned airflow.

On the other hand, FIG. 6B depicts the situation where the damper 110 has been positioned whereby the damper body apertures 135 and corresponding scent-dispensing housing rear wall apertures 124 are not aligned. Here, conditioned air does not pass through the scent-dispensing chamber 106 (see arrows) and scent from the module 140 is not dispensed into the passenger cabin. By the acute angle defined by the scent-dispensing chamber rear wall 122, a smooth airflow pattern across the scent-dispensing chamber 106 is promoted. This prevents creation of turbulence adjacent the scent-dispensing chamber 106 which could potentially disrupt airflow passing through the vent register vanes 104.

By the foregoing description, the skilled artisan will appreciate that a convenient, effective device for dispensing a desired scent into a vehicle interior is provided. Advantageously, as shown in FIGS. 5, 6A, and 6B, the described scent-dispensing chamber 106 does not increase the size of the illustrated vent register 100. Indeed, as shown in the drawing figures, the scent-dispensing chamber 106 can easily be dimensioned to occupy the same height and width dimension as a conventional vent register vane 104. Thus, by the simple expedient of positioning the described scent-dispensing chamber 106 in the space that would otherwise be occupied by one or more of the pivoting vanes 104, a scent dispensing vent register 100 is provided that easily fits into the same-sized vent register housing 102. There is accordingly no need to modify the dimensions other components of the vehicle such as the apertures provided to accommodate a vent register in the dash panel, door trim panels, etc. A dash panel aperture dimensioned to accommodate a conventional vent register will likewise accommodate the vent register 100 described herein. This significantly reduces manufacturing costs relating to tooling, raw materials, engineering design, etc.

Obvious modifications and variations are possible in light of the above teachings. For example, the disclosure depicts and describes a sliding damper 110. However, alternative sliding damper configurations are known in the art such as rotating disc dampers, and such are contemplated for use herein also. Likewise, a manually actuated damper 110 is described, but motorized or automated dampers are also known in the art and contemplated for use herein. Still more, alternative embodiments for the closeable front panel 112 are contemplated, such as a sliding panel similar in operation to a garage door, a front panel hinged at a side rather than at the bottom, and others. Therefore, the disclosure should not be taken as limiting in this respect. All such modifications and variations are within the scope of the appended claims when interpreted in accordance with the breadth to which they are fairly, legally and equitably entitled.

What is claimed:

1. A vent register comprising:
   a housing in fluid communication with a heating, ventilation, and air-conditioning (HVAC) duct system; and
   an interior scent-dispensing chamber disposed within the housing and configured to selectively allow an HVAC airflow therethrough.

2. The vent register of claim 1, wherein the scent-dispensing chamber includes a damper-supporting wall having one or more apertures and carrying a selectively translatable damper disposed at an upstream portion of the scent-dispensing chamber relative to an exit of the HVAC airflow from the housing.

3. The vent register of claim 2, wherein at least a portion of the damper-supporting wall is disposed to define an acute angle relative to a plane defined by a wall of the vent register housing.

4. The vent register of claim 2, wherein the damper is selectively translatable between an open configuration allowing an HVAC airflow through the scent-dispensing chamber and a closed configuration preventing the HVAC airflow through the scent-dispensing chamber.

5. The vent register of claim 2, wherein the damper-supporting wall further includes one or more damper supports configured to allow sliding translation of the damper between the open configuration and the closed configuration.

6. The vent register of claim 2, wherein the damper includes one or more damper apertures disposed to at least partially align with the one or more apertures when the damper is translated from the closed configuration to the open configuration.

7. The vent register of claim 3, wherein the damper includes a first portion defining a same angle as the acute angle and a second portion carrying an actuator.

8. The vent register of claim 7, wherein the actuator is configured to pass through a slot defined in a roof of the scent-dispensing chamber, whereby the actuator functions also as a dog to retain the selectively translatable damper in operative contact with an interior of the scent-dispensing chamber.

9. The vent register of claim 1, wherein the scent-dispensing chamber includes a selectively closeable front panel.

10. A vent register for a motor vehicle, comprising:
    a housing in fluid communication with a vehicle heating, ventilation, and air-conditioning (HVAC) duct system;
    a plurality of vanes pivotally carried by the housing for directing an HVAC airflow; and
    an interior scent-dispensing chamber disposed within the housing and configured to selectively allow the HVAC airflow therethrough.

11. The vent register of claim 10, wherein the scent-dispensing chamber includes a damper-supporting wall having one or more apertures and carrying a selectively translatable damper disposed, relative to a direction of flow of the HVAC airflow, upstream of the plurality of vanes.

12. The vent register of claim 11, wherein at least a portion of the damper-supporting wall is disposed to define an acute angle relative to a plane defined by a wall of the vent register housing.

13. The vent register of claim 11, wherein the damper is selectively translatable between an open configuration allowing the HVAC airflow through the scent-dispensing chamber and a closed configuration preventing the HVAC airflow through the scent-dispensing chamber.

14. The vent register of claim 11, wherein the damper-supporting wall further includes one or more damper supports configured to allow sliding translation of the selectively translatable damper between the open configuration and the closed configuration.

15. The vent register of claim 11, wherein the selectively translatable damper includes one or more damper apertures disposed to at least partially align with the one or more apertures when the damper is translated from the closed configuration to the open configuration.

16. The vent register of claim 12, wherein the selectively translatable damper includes a first portion defining a same angle as the damper-supporting wall acute angle and a second portion carrying an actuator.

17. The vent register of claim 16, wherein the actuator is configured to pass through a slot defined in a roof of the scent-dispensing chamber, whereby the actuator functions also as a dog to retain the selectively translatable damper in operative contact with an interior of the scent-dispensing chamber.

18. The vent register of claim 10, wherein the scent-dispensing chamber includes a selectively closeable front panel.

19. The vent register of claim 10, wherein the scent-dispensing chamber defines a same width dimension and height dimension as one or more of the plurality of vanes.

20. A motor vehicle including the vent register of claim 10.

* * * * *